US012722569B2

(12) United States Patent
Salter et al.

(10) Patent No.: US 12,722,569 B2
(45) Date of Patent: Sep. 1, 2026

(54) COMBINED VEHICLE CLIMBING LADDER AND RECOVERY BOARD

(71) Applicant: Ford Global Technologies, LLC, Dearborn, MI (US)

(72) Inventors: Stuart C. Salter, White Lake, MI (US); Jeffrey Robert Seaman, Brownstown, MI (US); David Brian Glickman, Southfield, MI (US); Paul Kenneth Dellock, Northville, MI (US); Annette Lynn Huebner, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1758 days.

(21) Appl. No.: 17/013,980

(22) Filed: Sep. 8, 2020

(65) Prior Publication Data

US 2022/0073004 A1 Mar. 10, 2022

(51) Int. Cl.
*B60R 3/00* (2006.01)
*B60B 39/12* (2006.01)
(Continued)

(52) U.S. Cl.
CPC .............. *B60R 3/007* (2013.01); *B60B 39/12* (2013.01); *B60P 7/14* (2013.01); *B60R 3/04* (2013.01);
(Continued)

(58) Field of Classification Search
CPC ........... B60R 3/007; B60R 3/04; B60R 3/005; B60B 39/12; B60B 2900/551; B60B 2900/721; B60P 7/14; E06C 1/10; E06C 1/36; E06C 1/10; E06C 1/005; E06C 7/14; E06C 7/50; E06C 7/06; E06C 7/488; E06C 7/165; E06C 7/087; E06C 7/505; E06C 5/24; E06C 5/02; E06C 5/04; E05B 3/00;
(Continued)

(56) References Cited

U.S. PATENT DOCUMENTS 1,339,612 A * 5/1920 Wilkins .................. B60B 39/12 294/51
1,366,031 A * 1/1921 Snow ...................... B60B 39/12 238/14
(Continued)

FOREIGN PATENT DOCUMENTS

AU 2011202303 12/2012
AU 2011202303 A1 * 12/2012
(Continued)

OTHER PUBLICATIONS

Pirti, Atinc, et al. Evaluating Repeatability of RTK GPS/GLONASS Near/Under Forest Environment, Croatian Journal for Engineering, 31 (2010)1, p. 23-33.

*Primary Examiner* — Jessica L Laux
*Assistant Examiner* — Kathleen M. McFarland
(74) *Attorney, Agent, or Firm* — Vichit Chea; Carlson, Gaskey & Olds, P.C.

(57) ABSTRACT

A vehicle assembly, includes, among other things, an accessory usable as a climbing ladder to access an area of a vehicle. The accessory is also configured to be used as a recovery board. A method of using a vehicle accessory includes, among other things, accessing a vertically upper area of a vehicle using an accessory as a climbing ladder, the accessory also usable as a recovery board.

20 Claims, 5 Drawing Sheets

(51) Int. Cl.

| | |
|---|---|
| ***B60P 7/14*** | (2006.01) |
| ***B60R 3/04*** | (2006.01) |
| ***E06C 1/10*** | (2006.01) |
| ***E06C 7/14*** | (2006.01) |
| ***E06C 7/50*** | (2006.01) |

(52) U.S. Cl.
CPC .................. *E06C 1/10* (2013.01); *E06C 7/14* (2013.01); *E06C 7/50* (2013.01)

(58) Field of Classification Search
CPC .... E05B 63/0013; E05B 65/106; E05B 57/00; E05C 9/1875; E05C 9/06
See application file for complete search history.

(56) References Cited

U.S. PATENT DOCUMENTS 1,574,729 A * 2/1926 Foster ..................... B60B 39/12 238/14
1,718,509 A * 6/1929 West ....................... B60B 39/12 238/14
2,496,119 A * 1/1950 Cesen ..................... B60B 39/12 238/14
2,619,289 A * 11/1952 Plante ..................... B60B 39/12 238/14
3,006,432 A * 10/1961 Gurley ..................... E06C 1/10 182/27
3,630,440 A * 12/1971 Sams ...................... B60B 39/12 238/14
3,740,072 A * 6/1973 Veith ........................ B60R 3/04 280/164.2
4,278,376 A * 7/1981 Hunter ...................... B60P 7/14 410/104
4,431,082 A * 2/1984 Bott ......................... E06C 5/02 182/127
4,869,520 A * 9/1989 Cole ....................... E06C 7/081 182/127
4,887,947 A * 12/1989 Bott ......................... B60P 7/14 410/144
4,993,768 A * 2/1991 Ewen ...................... B60B 39/12 294/51
5,024,285 A * 6/1991 Fujita ...................... B60T 8/175 701/84
5,167,479 A * 12/1992 Bott ....................... B01D 53/52 410/121
5,236,062 A * 8/1993 Laney ....................... E06C 5/02 224/511
5,402,941 A * 4/1995 MacLeod ................ B60B 39/12 238/14
5,411,355 A * 5/1995 Gosnell ..................... B60P 7/14 410/139
5,439,171 A * 8/1995 Fruend .................... B60B 39/12 238/14
5,538,183 A * 7/1996 McGee ................... B60B 39/12 238/14
5,800,145 A * 9/1998 Kelce ........................ B60P 7/14 410/121
5,833,136 A * 11/1998 Japp ....................... B60B 39/12 238/14
5,975,819 A * 11/1999 Cola ......................... B60P 7/14 410/121
6,073,725 A * 6/2000 Kumher .................... E06C 5/02 182/127
6,120,076 A * 9/2000 Adsit ........................ B60P 7/14 296/26.11
6,158,798 A * 12/2000 Stedtfeld ............. B62D 33/033 296/10
6,520,420 B1 * 2/2003 Singh ...................... B60B 39/12 238/14
6,520,523 B2 * 2/2003 Beck ...................... B60R 3/007 14/2.4
6,772,928 B2 * 8/2004 Ford ....................... B60R 3/005 224/310
6,948,755 B1 * 9/2005 Bauer ..................... B60P 1/435 296/61
6,971,478 B2 * 12/2005 Bareket ..................... B60R 3/00 182/95
7,063,187 B1 * 6/2006 Lavigne .................... E06C 1/39 248/238
7,195,432 B2 * 3/2007 Earle ......................... B60P 7/14 410/121
7,708,294 B2 * 5/2010 Demick .................. B60R 3/007 280/163
7,731,260 B2 * 6/2010 Heller ....................... B60P 7/14 296/50
8,016,528 B2 * 9/2011 Kmita ....................... B60P 7/14 410/139
8,231,066 B2 * 7/2012 McCarthy ............... B60B 39/12 238/14
8,684,278 B2 * 4/2014 Brown, Jr. .............. B60B 39/12 238/14
8,827,173 B2 * 9/2014 Nutzati ................... B60B 39/12 238/14
9,500,027 B2 * 11/2016 Walter ...................... E06C 7/50
9,925,924 B1 * 3/2018 Grabowski ............... B60R 3/04
9,963,060 B1 * 5/2018 Vick ....................... B60R 3/007
10,030,446 B2 * 7/2018 Badillo .................. B62D 65/16
10,661,606 B2 * 5/2020 McCarthy ............... B60B 39/12
10,927,599 B2 * 2/2021 Nakari ...................... E06C 5/24
11,338,617 B2 * 5/2022 Smith ..................... B60B 39/12
11,414,136 B2 * 8/2022 Petty ....................... B60B 39/12
11,548,447 B2 * 1/2023 Sutton ..................... B60P 1/003
11,628,774 B2 * 4/2023 Weston ................... B60R 3/002 280/164.1
11,738,598 B2 * 8/2023 Hadley ................... B60B 39/12 238/14
11,772,421 B2 * 10/2023 Hackler .................. B60B 39/12 238/14
2002/0163157 A1 * 11/2002 Beck ....................... B60R 3/007 280/163
2003/0201288 A1 * 10/2003 Ford ......................... B60R 9/06 224/310
2004/0069566 A1 * 4/2004 Bareket ..................... B60R 3/00 182/127
2006/0076794 A1 * 4/2006 Bauer ..................... B60P 1/435 296/37.6
2006/0239790 A1 * 10/2006 Earle ......................... B60P 7/14 410/94
2008/0101885 A1 * 5/2008 Kmita ....................... B60P 7/14 410/130
2008/0106058 A1 * 5/2008 Demick .................. B60R 3/002 14/71.1
2008/0315608 A1 * 12/2008 Heller ................ B62D 33/0273 296/183.1
2010/0230209 A1 * 9/2010 Hughes ..................... E06C 7/48 182/127
2012/0193439 A1 * 8/2012 Brown, Jr. .............. B60B 39/12 238/14
2013/0343863 A1 * 12/2013 Nemeth .................... E06C 5/04 182/129
2015/0060204 A1 * 3/2015 Walter ...................... E06C 7/08 182/163
2016/0121653 A1 * 5/2016 Letarte .................... B60B 39/00 238/14
2017/0144605 A1 * 5/2017 Kelly ........................ E06C 5/04
2018/0029416 A1 * 2/2018 McCarthy ............... B60B 39/12
2018/0044985 A1 * 2/2018 Orscheln .................. B60R 3/02
2018/0290596 A1 * 10/2018 Fukushima ............. B60R 3/005
2018/0339552 A1 * 11/2018 Hermans ................. B60C 27/00
2019/0176707 A1 * 6/2019 Liao ......................... B60R 3/02
2021/0339565 A1 * 11/2021 Nommensen ........... B60B 39/12
2022/0073004 A1 * 3/2022 Salter ...................... B60B 39/12

(56) References Cited

U.S. PATENT DOCUMENTS

| | | | | |
|---|---|---|---|---|
| 2022/0134955 | A1* | 5/2022 | Kaddouh | E06C 5/02<br>182/127 |
| 2022/0289112 | A1* | 9/2022 | Parack | B60R 3/02 |

FOREIGN PATENT DOCUMENTS

| | | | | | |
|---|---|---|---|---|---|
| AU | 2013206349 | A1 | * | 1/2014 | |
| AU | 2020100536 | B4 | * | 8/2020 | |
| CA | 1219020 | A | * | 3/1987 | B60R 3/007 |
| CA | 2137486 | A1 | * | 6/1996 | |
| CA | 2537518 | A1 | * | 8/2007 | B60B 39/12 |
| CN | 202294091 | | | 7/2012 | |
| CN | 202294091 | U | * | 7/2012 | |
| CN | 205153375 | | | 4/2016 | |
| CN | 205153375 | U | * | 4/2016 | |
| CN | 111946243 | A | * | 11/2020 | A61G 1/013 |
| JP | 08058474 | A | * | 3/1996 | B60R 3/005 |
| JP | 08175270 | A | * | 7/1996 | B60R 3/002 |
| KR | 100428451 | B1 | * | 4/2004 | |
| WO | WO-2017075665 | A1 | * | 5/2017 | B60B 39/12 |

* cited by examiner 10
38
26
34
22
14
18D
30
18
18C
18A
18B
50

10
26
34
22
14
18D
30
18
18C
18A
100
18B
54
50
M
104
58
50

COMBINED VEHICLE CLIMBING LADDER AND RECOVERY BOARD

TECHNICAL FIELD

This disclosure relates generally to a vehicle accessory that can be used as a climbing ladder or a recovery board.

BACKGROUND

Vertically upper areas of a vehicle can be used to store and transport cargo. An individual may need to access the upper areas to load or remove cargo. The individual may utilize the upper areas of the vehicle for seating when, for example, observing a sporting event.

SUMMARY

A vehicle assembly, according to an exemplary aspect of the present disclosure includes, among other things, an accessory usable as a climbing ladder to access an area of a vehicle. The accessory is also configured to be used as a recovery board.

In another example of the foregoing assembly, the accessory, when used as a climbing ladder, is configured to be placed adjacent to the vehicle and climbed by a user to provide the user with access to a vertically upper area of the vehicle.

In another example of any of the foregoing assemblies, the accessory, when used as a recovery board, is configured to be placed adjacent to a wheel of the vehicle to enhance traction of the wheel.

In another example of any of the foregoing assemblies, at least a portion of the accessory can be utilized as a cargo divider within a cargo area of the vehicle.

In another example of any of the foregoing assemblies, the accessory includes a plurality of traction nibs.

In another example of any of the foregoing assemblies, the accessory includes a boot scraper.

In another example of any of the foregoing assemblies, the accessory includes a first section and a second section. The first section is coupled to the second section when the accessory is used as a climbing ladder.

In another example of any of the foregoing assemblies, the first section is configured to span from a first side wall within a cargo area of the vehicle to an opposite, second side wall of the cargo area to provide a cargo divider.

In another example of any of the foregoing assemblies, the first section has a first longitudinal end received within a groove of a first side wall, and a second longitudinal end received within a groove of an opposite, second side wall when the first section is used as a cargo divider.

In another example of any of the foregoing assemblies, the accessory includes a bag hanger.

In another example of any of the foregoing assemblies, the accessory is configured to receive a flange extending from a rail of the vehicle when the accessory is used as a climbing ladder.

In another example of any of the foregoing assemblies, at least a portion of the accessory is sandwiched between the flange and a lock tab that is secured to a rail of the vehicle when the accessory is used as a climbing ladder.

In another example of any of the foregoing assemblies, the lock tab is configured to pivot relative to the rail.

Another example of any of the foregoing assemblies includes a joiner clamp configured to secure a first section of the accessory to a second section of the accessory when the accessory is used as a climbing ladder.

In another example of any of the foregoing assemblies, the joiner clamp includes tabs received within slots of the accessory when joining a first section of the accessory and the second section of the accessory when the accessory is used as a climbing ladder.

A method of using a vehicle accessory according to another exemplary aspect of the present disclosure includes, among other things, accessing a vertically upper area of a vehicle using an accessory as a climbing ladder. The accessory is also usable as a recovery board.

In another example of the foregoing method, when using the accessory as a climbing ladder, a first section of the accessory is connected to a second section of the accessory to increase a longitudinal length of the accessory.

Another example of the foregoing method includes, prior to the accessing, removing at least a section of the accessory from a cargo area of the vehicle where the section is used as a cargo divider.

In another example of the foregoing method, the removing includes withdrawing the section from a slot within a cargo area of the vehicle.

Another example of the foregoing method includes hooking the accessory over a flange extending from the vehicle when using the accessory as a climbing ladder.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary vehicle accessory that can be utilized as a climbing ladder or as a recovery board. When used as a climbing ladder, the vehicle accessory can help a user reach upper areas of a vehicle to, for example, reposition cargo or to access a chair. When used as a recovery board, the vehicle accessory can be placed adjacent to a wheel of the vehicle to help the vehicle move through sand or mud, for example. These and other features of the disclosure are described in greater detail below.

Figures 1, 2:
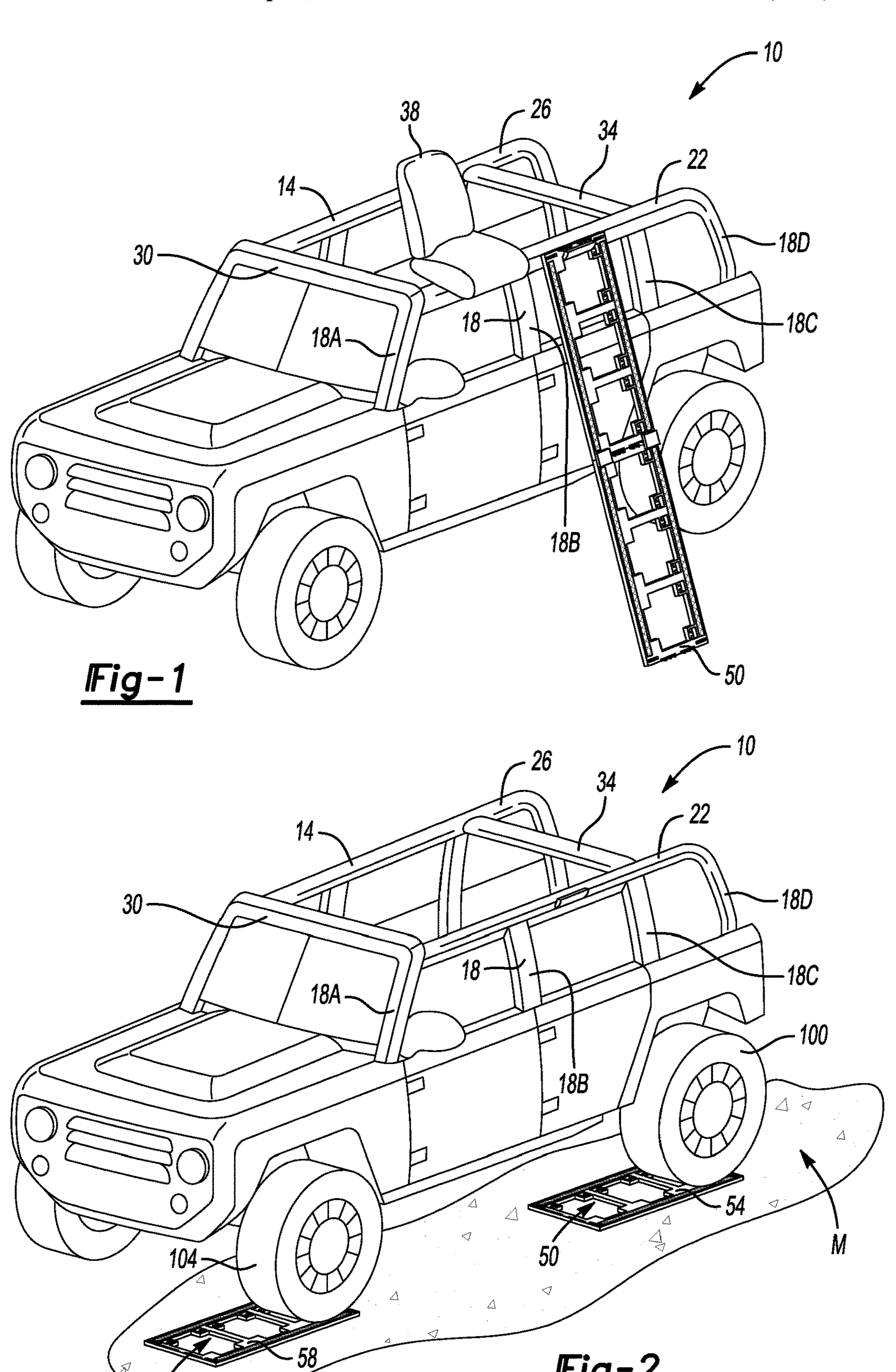
FIG. 1 is a perspective view of a vehicle accessory having sections coupled together and used as a climbing ladder.
FIG. 2 is a perspective view of the vehicle accessory of FIG. 1 where the sections are used as recovery boards.
Figure 3:
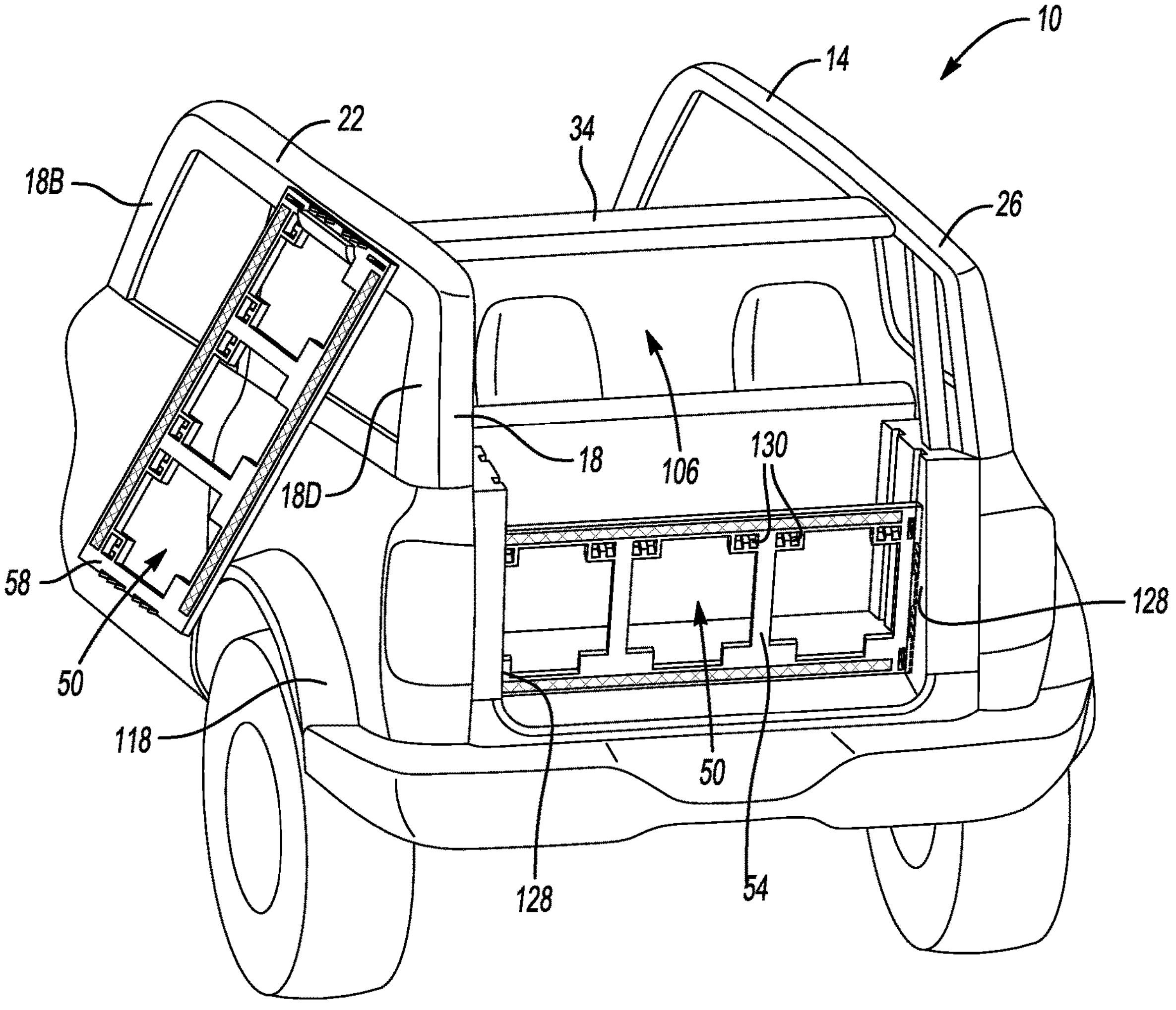
FIG. 3 is a perspective view of the vehicle accessory with a section being used as a climbing ladder and another section used as a cargo divider.

FIGS. 1-3 show a motor vehicle 10. In the exemplary embodiment, the vehicle 10 is a sport utility vehicle (SUV). However, the vehicle could alternatively be a car, pickup truck, van, or any other type of vehicle. The vehicle 10 could be a conventional motor vehicle driven by an internal combustion engine. The vehicle 10 could be a battery powered hybrid or electric vehicle. The vehicle 10 could further be an autonomous vehicle (i.e., a driverless vehicle).

Although a specific component relationship is illustrated in the figures of this disclosure. The illustrations are not intended to limit this disclosure. In other words, the placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes an upper area 14 supported by a plurality of pillars 18. In this example, the vehicle 10 is a four-door vehicle and therefore includes A-pillars 18A which are closest to a front of the vehicle 10, D-pillars 18D, which are closest to a rear of the vehicle 10, and B-pillars 18B and C-pillars 18C, which are intermediate pillars disposed between A-pillars 18A and the D-pillars 18D. The teachings of this disclosure, however, are applicable to other types of vehicles, such as two-door vehicles having one door assembly located on both the driver side and the passenger side of the vehicle.

The upper area 14 can include a removable hard top (not shown) though a hard top could include a plurality of removable panels made of a rigid material, such as one or more plastic, metal, and/or glass. During periods of good weather, the vehicle 10 can be operated with the panels removed as shown, which can provide an open-air riding experience for occupants of the vehicle 10.

Notably, an operator of the vehicle can leverage the space afforded by the upper area 14 and rails 22, 26 and crossbars 30, 34 of the upper area 14 during various activities. As an example, at least one chair 38 (FIG. 1) can be secured to the upper area 14 of the vehicle 10. An individual can sit in the chair 38 when the vehicle 10 is stationary to view various events, such as a sporting event. Sitting in the chair 38 enables the user to view the event from an elevated position, which can provide an enhanced viewing experience.

A vehicle accessory 50 can be used as a climbing ladder. The user can climb the climbing ladder provided by the accessory 50 to access the upper area 14 and to, for example, move to a position seated in the chair 38. When the accessory 50 is used as a climbing ladder as shown in FIG. 1, the accessory 50 is placed adjacent to the vehicle 10. The user can climb the accessory 50 to give the user access to vertical upper areas of the vehicle 10 when loading cargo or moving to a position seated within the chair 38.

The accessory 50 can be used in other ways. The accessory 50 can provide, for example, as one or more recovery boards as shown in FIG. 2. The accessory 50 can provide a cargo divider or a shorter climbing ladder as shown in FIG. 3.

Figure 4:
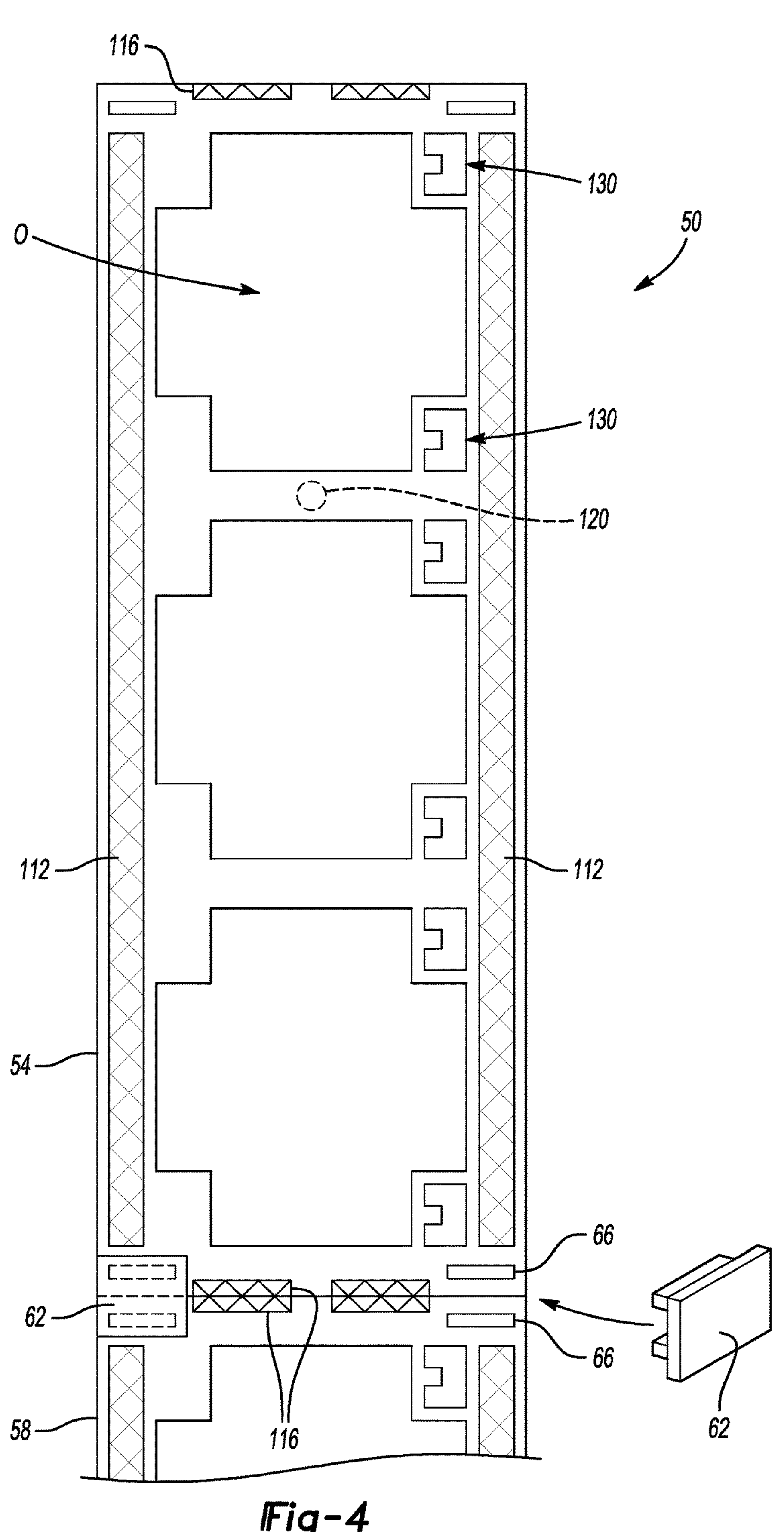
FIG. 4 is a front view of a portion of the vehicle accessory of FIGS. 1-3.
Figure 5:
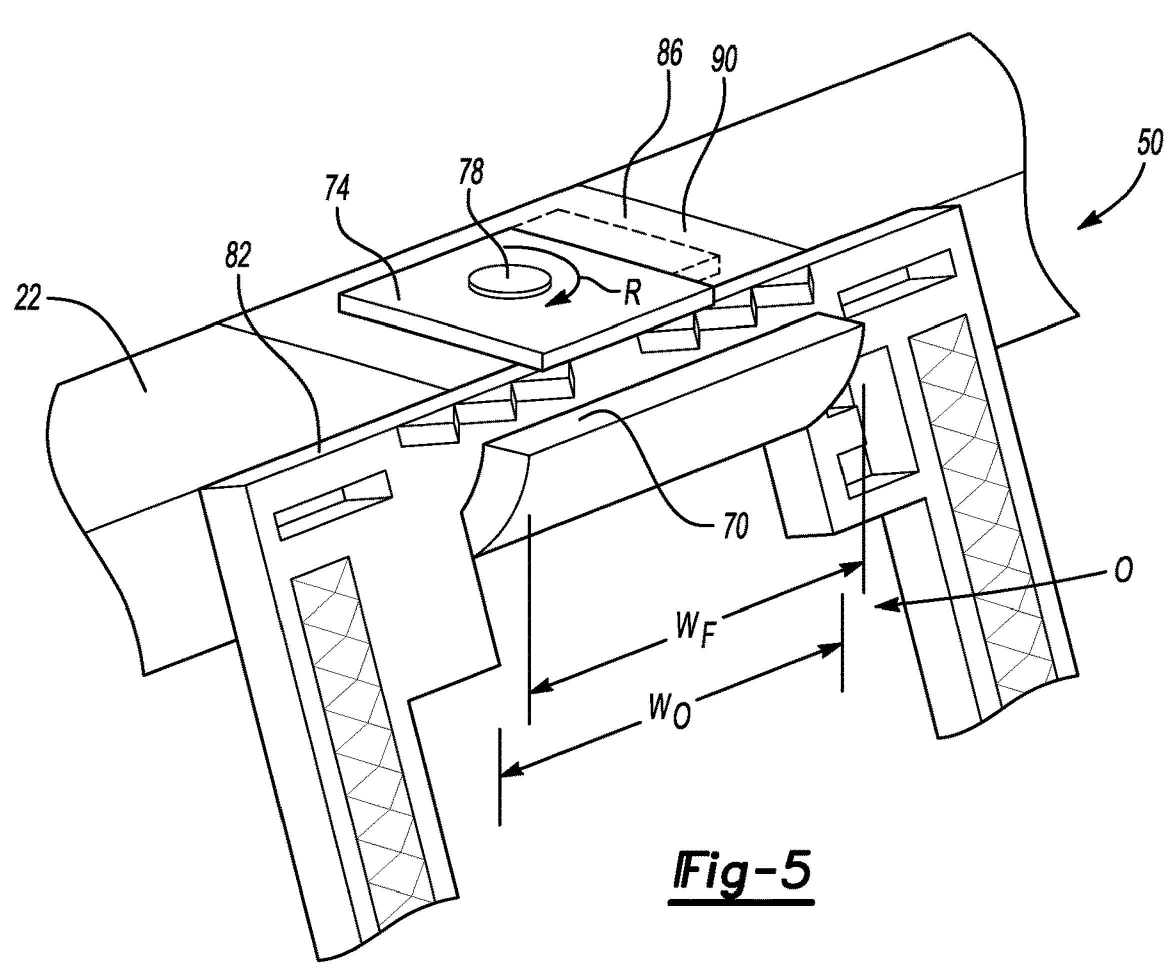
FIG. 5 is a close-up view of an area of FIG. 1 showing where the vehicle accessory is coupled to the vehicle when the vehicle accessory is used as a climbing ladder.

With reference now to FIGS. 4 and 5, the accessory 50, in the exemplary embodiment, includes a first section 54 and a second section 58. A pair of joiner clamps 62 connect the first section 54 to the second section 58 to join the sections 54 and 58 together when the accessory 50 is used to provide the climbing ladder shown in FIG. 1.

The joiner clamps 62 can include tabs that fit within openings 66 on both the first section 54 and the second section 58 of the accessory 50. The joiner clamps 62 can snap-fit together the first section 54 and the second section 58 in some examples.

To position the accessory 50 relative to the vehicle 10 when the accessory 50 is used to provide a climbing ladder, the first section 54 can be moved such that an opening O within the first section 54 receives a flange 70. In this example, the flange 70 extends laterally outward from the rail 22, and the accessory 50 is hooked over the flange 70. The width Wo of the opening where the opening O receives the flange 70 is about the same as a width $W_F$ of the flange 70. This can help to prevent the accessory 50 from sliding relative to the flange 70 when the flange 70 is inserted within the opening O. The flange 70 is upturned to help further stabilize the accessory 50.

In this example, after inserting the flange 70 through the opening O, a lock tab 74 can be rotated about a pivot 78 where the lock tab 74 is pivotably secured to the rail 22. The lock tab 74 can be rotated in the direction R to the position shown in FIG. 5 where the lock tab 74 overhangs an upper edge 82 of the accessory 50. This position sandwiches a portion of the accessory 50 between the lock tab 74 and the flange 70 which can still further stabilize the accessory 50 when being used as a climbing ladder.

In some examples, the lock tab 74 is part of a lock tab assembly 86 that includes the pivot 78 securing the lock tab 74 to a housing 90. The housing 90 can be secured directly to the rail 22. A rubber seal can be secured to the housing 90 to seal an interface between the housing 90 and the rail 22. The lock tab assembly 86 can be an aftermarket product.

In other examples, the accessory 50 could couple to the vehicle 10 in other ways when used as a climbing ladder. The accessory 50 could coupled to the vehicle 10 through a drop-in lock pin, a clamp, a threaded fastener, an electromechanical device, etc.

When the accessory 50 is used as a recovery board, the sections 54 and 58 of the accessory 50 can be separated from one another. As shown in FIG. 2, the sections 54 and 58 can be placed adjacent different wheels of the vehicle 10. In another example, the sections 54 and 58 remain joined to one another when used as a recovery board.

In FIG. 2, the section 54 is placed adjacent to a rear driver side wheel 100 of the vehicle 10 while the section 58 is placed adjacent to a front driver side wheel 104 of the vehicle 10. The wheels 100, 104 of the vehicle 10 are moving through mud M. After positioning the sections 54, 58 of the accessory 50, the user can operate the vehicle 10 and drive the wheels 100, 104 over the sections 54, 58. The wheels 100, 104 can grip sections 54, 58 to enhance traction for the wheels 100, 104. This can facilitate extricating the vehicle 10 from the mud M.

The accessory 50 includes features to facilitate traction. As shown in FIG. 4, areas of the accessory 50 include traction nibs 112, which can be raised and dimpled areas of the accessory 50. After the vehicle 10 is no longer stuck in the mud M, the sections 54, 58 of the accessory 50 can be retrieved.

The recovery board can help the vehicle 10 gain traction when stuck. The recovery board can also help the vehicle 10 traverse over uneven terrain. A thickness of the accessory 50 can be 2.5 millimeters, which can help the accessory 50 provide the recovery board as the wheels 100, 104 are able to drive over the accessory 50 having such a thickness. In another example, the thickness of the accessory 50 is four millimeters or less. A conventional step ladder would have a thickness much greater than four millimeters, which would block wheels from driving over the conventional step ladder.

The accessory 50 can be a polymer-based material, a metal or metal alloy material, or some combination of these. The accessory 50 could include, for example, a metal alloy frame with a polymer-based material over molded about the metal alloy frame.

The traction nibs 112 can be provided by a secondary operation such as punch or cutting operation. The traction nibs 112 can be molded-in and formed from a polymer-based material.

In the exemplary embodiment, opposing ends of the sections 54 and 58 include scrapers 116 which can be utilized by a user to scrape their shoes. As an example, after retrieving the sections 54, 58 of the accessory 50 from the mud M, the user's shoes may be caked with mud. The scrapers 116 can then be utilized by the user to remove mud from the user's shoes.

When not used as a climbing ladder or recovery board, the section 54, the section 58, or both, can be used as a cargo divider within a cargo area 106 of the vehicle 10 as shown in FIG. 3. In this example, the section 54 is used as the cargo divider while the section 58 remains secured to the rail 22 of the vehicle 10 and is available for use as a climbing ladder that is shorter than the climbing ladder of FIG. 1. To access the section 58 when used alone as the climbing ladder shown in FIG. 3, the user can step on a fender 118 of the vehicle 10 and then up to the second section 58.

Figure 6:
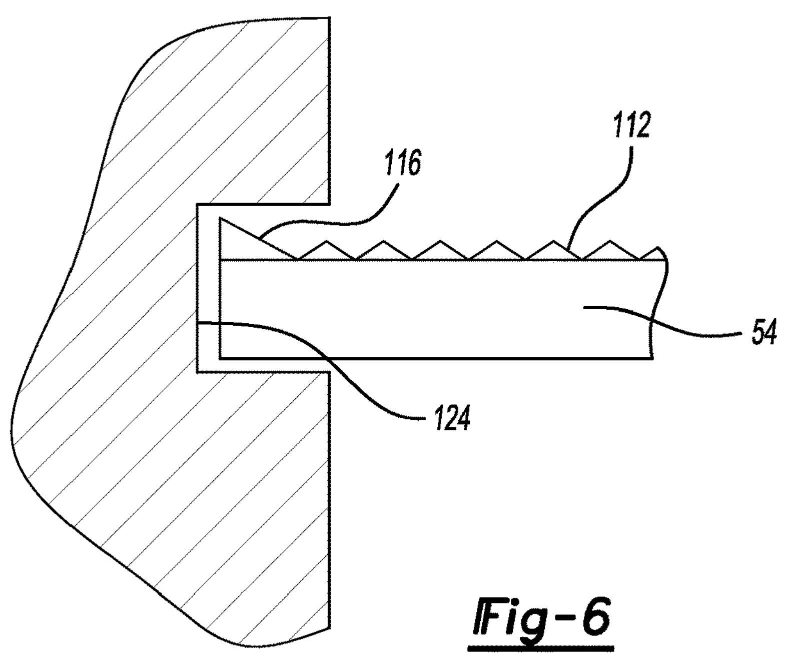
FIG. 6 is top view showing an end of the vehicle accessory received within a groove when the section is used as a cargo divider.

Referring to FIG. 6 with continuing reference to FIG. 3, when the first section 54 is utilized as the cargo divider, the longitudinal ends of the first section 54 can each slide within a groove 124 of a side wall 128 of the vehicle 10. The side wall 128 delineates part of a cargo area of the vehicle 10. Sliding the ends into the grooves 124 can conceal the scrapers 116.

The first and second sections 54, 58 each include a plurality of openings and tabs 130 that can provide areas to hang grocery bags or other accessories when, for example, the section 54, 58 is utilized as the cargo divider.

In some examples, one or more of the sections 54, 58 can include a ruler (to measure fish, for example), a bottle opener, or both.

If the user desires to remove the second section 58 from being used as the climbing ladder as shown in FIG. 3, the second section 58 can be utilized as an additional cargo divider for the vehicle 10 in the same manner as the section 54. The groove 124, in some examples, is wide enough to accommodate ends of both sections 54, 58. In other examples, the section 54 is further forward in the cargo area 106 that the section 58 and each section 54 and 58 fits within its own pair of opposing grooves. In such examples, the sections 54, 58 divide the cargo area 106 into three storage areas.

The sections 54, 58 could, in some example, be used as ramps to assist in loading an item in the cargo area 106. The sections 54, 58 could be stored within designated pockets molded within a portion of the cargo area 106, such as a floor of the cargo area 106.

Figure 7:
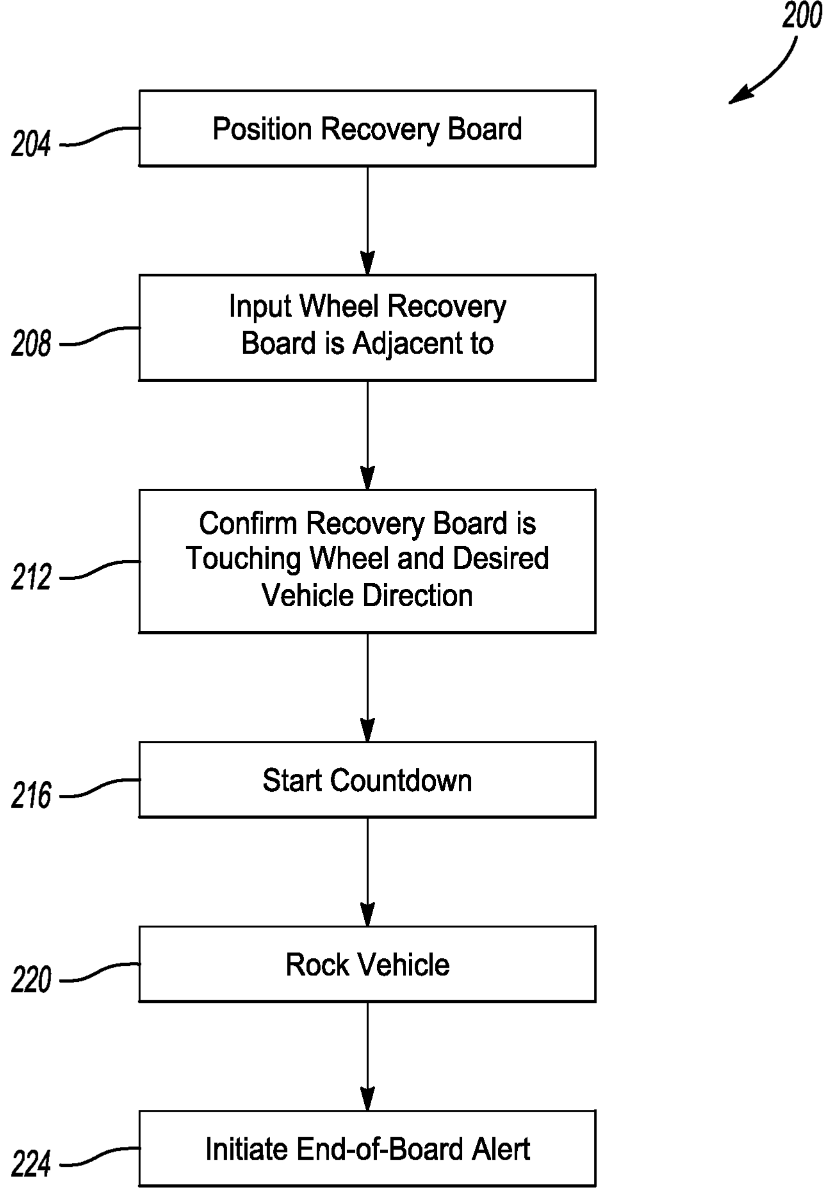
FIG. 7 illustrates a flow of an example method of using the vehicle accessory as a recovery board.

With reference now to FIG. 7, a flow of an example method 200 of utilizing the accessory 50 as the recovery board shown in FIG. 2 begins at a step 204. After positioning the sections 54, 58 as shown in FIG. 2, the user inputs the wheel or wheels that the recovery board is placed adjacent to at a step 208. If positioned as shown in FIG. 2, the user would input the front and rear driver side wheels.

In some examples, the user may use recovery boards other than those provided by the sections 54, 58. In such examples, the user may input a length of the recovery boards as part of the method 200.

Next, at a step 212, the user confirms that the sections 54, 58 are touching the respective wheels 100, 104. The user also confirms a desired direction that the vehicle 10 will moves in, which is forward in this example. The user then, at a step 216, engages a timer feature which starts a countdown, say a five second countdown. This countdown gives the user time to place their hands on the steering wheel to steer the vehicle 10 once the vehicle 10 starts moving.

After the countdown, at a step 220, the transmission of the vehicle 10 reverses and quickly shifts to forward to create a rocking type movement, which can help wheels 100 and 104 to climb onto the respective sections 54 and 58 without excessive spinning of the wheels 100 and 104. The vehicle 10 then moves over the sections 54 and 58. As the wheels 100 and 104 approach the ends of the section 54 and 58, the vehicle 10 may provide an audio or touchscreen alert at a step 224, which can help to notify the user to take control of the vehicle 10. The user tapping the brake or accelerator pedal can stop the method 200.

In an example, movement of the wheels 100, 104 relative to the sections 54, 58 can be measured by monitoring movement of the wheels 100, which can be driven, versus other wheels which are not driven. In another example, the sections 54 and 58 can each include a Bluetooth low energy (BLE) transmitter 120 (FIG. 4) that be detected by the vehicle 10 to monitor relative movement of the vehicle 10. In yet another example, horizontal resolution of the vehicle 10 could be monitored by a global positioning system.

A display within the passenger compartment, for example, could provide a visual indication of progress of the movement of the wheels 100, 104 across the sections 54 and 58. The BLE transmitter 120 could also communicate with the vehicle 10 and, if the user forgets to stow the sections 54, 58 on the vehicle 10 could provide an alert such as an audio or an audio alarm. Thus, the BLE transmitter 120 on the sections 54 and 58 can help to ensure that the sections 54 and 58 are not left by the user within the mud M or when the user is utilizing the sections 54, 58 as benches, or as the climbing ladder.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:

an accessory usable as a climbing ladder to access an area of a vehicle, the accessory is also configured to be used as a recovery board, wherein the accessory is configured to receive an upturned flange extending from a rail of the vehicle when the accessory is used as a climbing ladder, wherein at least a portion of the accessory is sandwiched vertically between the upturned flange and a lock tab that is secured to the rail of the vehicle when the accessory is used as a climbing ladder.

2. The vehicle assembly of claim 1, wherein the accessory, when used as a climbing ladder, is configured to be placed adjacent to the vehicle and climbed by a user to provide the user with access to a vertically upper area of the vehicle.

3. The vehicle assembly of claim 2, wherein the accessory, when used as a recovery board, is configured to be placed adjacent to a wheel of the vehicle to enhance traction of the wheel.

4. The vehicle assembly of claim 3, wherein at least a portion of the accessory can be utilized as a cargo divider within a cargo area of the vehicle.

5. The vehicle assembly of claim 1, wherein the accessory includes a plurality of traction nibs, wherein a thickness of the accessory is four millimeters or less when used as a recovery board such that the accessory can be driven over.

6. The vehicle assembly of claim 1, wherein the accessory includes a boot scraper.

7. The vehicle assembly of claim 1, wherein the accessory includes a first section and a second section, the first section coupled to the second section when the accessory is used as a climbing ladder.

8. The vehicle assembly of claim 1, wherein the accessory includes a bag hanger.

9. The vehicle assembly of claim 1, wherein the lock tab is configured to pivot relative to the rail back-and-forth between a first position where the accessory is sandwiched vertically between the upturned flange and the lock tab and a second position where the accessory is not sandwiched vertically between the upturned flange and the lock tab.

10. The vehicle assembly of claim 1, further comprising a joiner clamp configured to secure a first section of the accessory to a second section of the accessory when the accessory is used as a climbing ladder.

11. The vehicle assembly of claim 10, wherein the joiner clamp includes tabs received within slots of the accessory when joining a first section of the accessory and the second section of the accessory when the accessory is used as a climbing ladder.

12. The vehicle assembly of claim 1, wherein the lock tab is pivotably secured to the rail of the vehicle.

13. A vehicle assembly, comprising:

an accessory usable as a climbing ladder to access an area of a vehicle, the accessory is also configured to be used as a recovery board, wherein the accessory includes a first section and a second section, the first section coupled to the second section when the accessory is used as a climbing ladder, wherein the first section is configured to span from a first side wall within a cargo area of the vehicle to an opposite, second side wall of the cargo area to provide a cargo divider, the first section received within a first groove of the first side wall and further received within a second groove of the second side wall when the first section spans from the first side wall to the second side wall to provide the cargo divider.

14. The vehicle assembly of claim 13, wherein the first section of the accessory includes a scraper, the scraper received within one of the first groove or the second groove when the first section spans from the first side wall to the second side wall to provide the cargo divider.

15. A method of using a vehicle accessory, comprising:

accessing a vertically upper area of a vehicle using an accessory as a climbing ladder, the accessory also usable as a recovery board;

hooking the accessory over a flange extending from the vehicle when using the accessory as a climbing ladder; and locking the accessory over the flange using a lock tab movable to a position that sandwiches a portion of the accessory between the lock tab and the flange.

16. The method of claim 15, wherein, when using the accessory as a climbing ladder, a first section of the accessory is connected to a second section of the accessory to increase a longitudinal length of the accessory.

17. The method of claim 15, further comprising prior to the accessing, removing at least a section of the accessory from a cargo area of the vehicle where the section is used as a cargo divider that spans from a first side wall on a driver side of the vehicle to a second side wall on a passenger side of the vehicle.

18. The method of claim 17, wherein the removing includes withdrawing the section from a slot within a cargo area of the vehicle.

19. The method of claim 15, wherein the flange is an upturned flange.

20. The vehicle assembly of claim 15, wherein the lock tab is pivotably secured to the rail of the vehicle.

* * * * *